US012499131B2

(12) United States Patent
Schneider et al.

(10) Patent No.: US 12,499,131 B2
(45) Date of Patent: Dec. 16, 2025

(54) DIMENSIONALITY REDUCTION OF TIME-SERIES DATA, AND SYSTEMS AND DEVICES THAT USE THE RESULTANT EMBEDDINGS

(71) Applicant: Ecole Polytechnique Federale De Lausanne, Lausanne (CH)

(72) Inventors: Steffen Schneider, Ferney-Voltaire (FR); Mackenzie W. Mathis, Geneva (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 0 days.

(21) Appl. No.: 18/718,968

(22) PCT Filed: Dec. 23, 2022

(86) PCT No.: PCT/EP2022/087778
§ 371 (c)(1),
(2) Date: Jun. 12, 2024

(87) PCT Pub. No.: WO2023/143843
PCT Pub. Date: Aug. 3, 2023

(65) Prior Publication Data
US 2025/0068650 A1 Feb. 27, 2025

Related U.S. Application Data

(60) Provisional application No. 63/302,670, filed on Jan. 25, 2022.

(51) Int. Cl.
G06F 16/00 (2019.01)
G06F 16/22 (2019.01)
G06F 16/28 (2019.01)

(52) U.S. Cl.
CPC ........ *G06F 16/285* (2019.01); *G06F 16/2264* (2019.01)

(58) Field of Classification Search
CPC ................... G06F 16/285; G06F 16/2264
(Continued)

(56) References Cited

U.S. PATENT DOCUMENTS 11,179,066 B2 * 11/2021 Kaifosh ............... A61B 5/1126
707/707
2018/0336452 A1 * 11/2018 Tschernezki ........... G06N 3/082
707/707

(Continued)

OTHER PUBLICATIONS

Banville et al., "Uncovering the structure of clinical EEG signals with self-supervised learning," Journal of Neural Engineering, Mar. 31, 2021, 18(4):046020, 22 pages.
(Continued)

*Primary Examiner* — Alexandria Y Bromell
(74) *Attorney, Agent, or Firm* — Fish & Richardson P.C.

(57) ABSTRACT

Methods, systems, and apparatus, including computer programs encoded on a computer storage medium, for dimensionality reduction of time-series using contrastive learning. A method can include receiving multidimensional input time series data that includes data from a session or sessions that span time, selecting positive samples and negative samples from the multidimensional input time series data for respective reference samples from the multidimensional input time series data, wherein the positive samples and negative samples are each selected with a respective predetermined distribution across the time of the session or sessions of the multidimensional input time series, and mapping the reference samples, the positive samples, and negative samples into a common embedding space.

22 Claims, 10 Drawing Sheets

(58) Field of Classification Search
USPC .......................................................... 707/740
See application file for complete search history.

(56) References Cited

U.S. PATENT DOCUMENTS

| | | | | |
|---|---|---|---|---|
| 2021/0256406 A1* | 8/2021 | Mueller | ................... | G06N 7/01 |
| | | | | 707/707 |
| 2021/0397254 A1* | 12/2021 | Seibel | ................... | G06V 10/764 |
| | | | | 707/707 |
| 2022/0208173 A1* | 6/2022 | Chang | ................... | G10L 13/027 |
| | | | | 707/707 |
| 2023/0003720 A1* | 1/2023 | Neel | ................... | G01N 33/5058 |
| | | | | 707/707 |

OTHER PUBLICATIONS

Banville et al., "Uncovering the structure of clinical EEG signals with self-supervised learning," CoRR, Submitted on Jul. 31, 2020, 32 pages.

Caron et al., "Emerging properties in self-supervised vision transformers," CORR, Submitted on May 24, 2021, arXiv:2104.14294, 21 pages.

Cheng et al., "Subject-aware contrastive learning for biosignals," CoRR, Submitted on Jun. 30, 2020, arXiv:2007.04871, 17 pages.

De Vries et al., "A large-scale standardized physiological survey reveals functional organization of the mouse visual cortex," Nature neuroscience, Jan. 2020, 23(1):138-51 (Author Manuscript).

Deitch et al., "Representational drift in the mouse visual cortex," Current biology, Oct. 11, 2021, 31(19):4327-39.

Franceschi et al., "Unsupervised scalable representation learning for multivariate time series," CoRR, Submitted Jan. 3, 2020, arXiv:1901. 10738, 25 pages.

Grosmark et al., "Diversity in neural firing dynamics supports both rigid and learned hippocampal sequences," Science, Mar. 25, 2016, 351(6280):1440-3 (Author Manuscript).

International Preliminary Report on Patentability in International Appln. No. PCT/EP2022/087778, mailed on Aug. 8, 2024, 14 pages.

International Search Report and Written Opinion in International Appln. No. PCT/EP2022/087778, mailed on May 8, 2023, 21 pages.

Invitation to Pay Additional Fees and, Where Applicable, Protest Fee in International Appln. No. PCT/EP2022/087778, mailed on Mar. 7, 2023, 13 pages.

Siegle et al., "Survey of spiking in the mouse visual system reveals functional hierarchy," Nature, Apr. 1, 2021, 592(7852):86-92 (Author Manuscript).

Tonekaboni et al., "Unsupervised representation learning for time series with temporal neighborhood coding," CoRR, Submitted Jun. 1, 2021, arXiv:2106.00750, 17 pages.

* cited by examiner

DIMENSIONALITY REDUCTION OF TIME-SERIES DATA, AND SYSTEMS AND DEVICES THAT USE THE RESULTANT EMBEDDINGS

CROSS REFERENCE TO RELATED APPLICATIONS

This application is a National Stage Application under 35 U.S.C. § 371 and claims the benefit of International Application No. PCT/EP2022/087778, filed Dec. 23, 2022, which claims priority to and the benefit of the U.S. Provisional Application Ser. No. 63/302,670, filed Jan. 25, 2022, the contents of both of which are incorporated herein by reference in their entirety.

BACKGROUND

This specification relates to dimensionality reduction of time-series data using contrastive learning, and to devices and methods that use the resultant embeddings.

The difficulty of translating high dimensional information into lower dimensional spaces or "embeddings" increases as non-linear relationships in the data increases.

In a simplistic example, imagine that one has extensive dietary and health records for several individuals. These records have information in a number of dimensions. For example, the dimensions could include detailed information not only about every type of food that the person has eaten at every meal over the last few years, but also information like age, gender, height, weight, resting heart rate, pre-existing medical conditions, whether the person has flu-like symptoms or is vomiting. Such records could be considered high dimensional information.

If there are direct, linear relationships between different dimensions of this data, they may be relatively easy to identify. For example, imagine that every person who eats a certain type of mushroom vomits within the next hour. There is a single dimension to the dietary data (namely, the eating of the mushroom) that suffices to explain at least some cases of observed behavior, i.e., vomiting. Depending on the context, it may be acceptable to embed all of the dimensions of the dietary data into a single dimension that represents whether a mushroom was eaten within the last hour or so if one is seeking to map dietary data to the observed vomiting behavior.

However, non-linear relationships that involve more dimensions may be more difficult to identify. For example, imagine that the only caters who become sick are below a certain weight, deficient in a certain nutrient before eating, and they only become sick when the mushroom is eaten in conjunction with garlic. Further, the nutrient deficiency can arise either due to a pre-existing medical condition or due to a dietary deficiency that results from poor diet over the preceding months. As the number of dimensions increases and the relationships between the dimensions become non-linear, identifying the data that are linked to the cater becoming sick becomes more difficult. In other words, translating or mapping the high dimensional information into a lower dimensional representation—i.e., finding a latent embedding—becomes much more difficult.

In many contexts, technicians reduce the dimensionality of real-world input data in order to facilitate classification of that data. Dimensionality reduction identifies the dimensions that are indicative of links and discards or ignores dimensions that are irrelevant or less relevant. In more typical terminology, the input data dimensions are "embedded" or otherwise translated into a lower-dimensional embedding space or "manifold" that retains the information necessary to classify the input data as something that is relevant to the output. "Position" within the embedding spaces or manifolds can represent the relationship between the data within the embedding space or manifold. In this sense, "position" does not necessarily indicate a physical location. Rather, position is defined in the dimensionality of the embedding space or manifold.

The examples above are presented in the context of causal links. However, the same terminology and considerations apply in other contexts. For example, there need not be a causal link between, e.g., an animal having certain characteristic features and classification of that animal as a cat or a dog.

Although the example above is artificial, technicians who are seeking to identify links often face even more challenging real-world situations. FIGS. 1 and 2 are graphs that illustrate this in an illustrative example. FIG. 1 is a graph that represents the electrical activity from 120 neurons recorded from electrodes that were implanted in the hippocampus of a rat. The electrical activity data spans a 40 second interval. FIG. 2 is a graph that represents the observed location of that same rat to the left and right of a track during the same 40 second interval. Even though there are only 120 dimensions in the recorded electrical activity data, classification of the electrical activity as linked to location on the track is very difficult.

Thus, reducing the dimensionality of the electrical activity data in FIG. 1 could be used to classify the electrical behavior of selected neurons as linked to the location information represented in FIG. 2. Indeed, in some circumstances, with knowledge of the electrical behavior, it may be possible to reconstruct location with reasonable accuracy.

SUMMARY

This specification describes technologies relating to dimensionality reduction of time-series data using contrastive learning, and to devices and methods that use the resultant embeddings.

In a first aspect, a method includes receiving multidimensional input time series data that includes data from a session or sessions that span time, selecting positive samples and negative samples from the multidimensional input time series data for respective reference samples from the multidimensional input time series data, wherein the positive samples and negative samples are each selected with a respective predetermined distribution across the time of the session or sessions of the multidimensional input time series, and mapping the reference samples, the positive samples, and negative samples into a common embedding space.

This first aspect and other aspects can include one or more of the following features. The predetermined distribution of the negative samples can be a uniform distribution across the time of the session or sessions of the multidimensional input time series. The predetermined distribution of the positive samples can be samples that are close in time to the respective reference samples. The method can also include receiving a label time series that includes either continuous or categorical labels and that spans the time of the session or sessions of the multidimensional input time series. At least one of the predetermined distributions can be a uniform distribution across the continuous or categorical labels of the label time series. The predetermined distribution for selection of positive samples can enforce uniform selection of the positive samples from data from different sessions in the multidimensional input time series data. The predetermined distribution for selection of positive samples can enforce uniform selection of the positive samples from data from different subjects. The method can also include using contrastive machine learning to develop the common embedding space.

The method can also include determining whether the common embedding space is sufficient. For example, the method can include determining differences between original labels in a label time series and labels decoded from the multidimensional input time series data using the embedding. As another example, the method can include comparing embeddings of time series data from different subjects or different sessions in the embedding. As another example, the method can include determining whether an objective function that characterizes the representation of the reference, positive, and negative samples in the embedding space is sufficiently optimized.

The method can also include receiving, from a user, data identifying a variable that is to be irrelevant to the mapping of the reference samples, the positive samples, and negative samples into the common embedding space. Selecting the positive samples can include selecting the positive samples to have a predetermined uniform distribution with respect to the variable that is to be irrelevant. The method can also include receiving, from a user, data identifying a variable that is to be relevant to the mapping of the reference samples, the positive samples, and negative samples into the common embedding space. Selecting the positive samples and the negative samples can include selecting the positive samples and the negative samples to have a predetermined non-uniform distribution with respect to the variable that is to be relevant. The multidimensional input time series data can characterize electrical activity in a plurality of neurons.

In a second aspect, a method of fabricating a brain-machine interface can include performing the method of the first aspect, embodying the common embedding space in one or more data processors, and providing the brain-machine interface with inputs configured to receive either further multidimensional input time series data that share dimensions with the multidimensional input time series data from which the positive samples and negative samples were selected or input that identifies positions within the common embedding space.

This second aspect and other aspects can include one or more of the following features. The method can also include providing the brain-machine interface with outputs configured to output either further multidimensional input time series data that share dimensions with the multidimensional input time series data from which the positive samples and negative samples were selected or output that identifies positions within the common embedding space.

In a third aspect, a method includes receiving multidimensional input time series data and related label time series data, receiving information characterizing a hypothesis that a label of the label time series data is hypothetically relevant to a sufficient embedding of the multidimensional input time series data, selecting positive samples and negative samples from the multidimensional input time series data, wherein the positive samples and negative samples are selected at least in part based on the hypothetically relevant label, embedding the multidimensional input time series data in an embedding space, determining that the embedding of the multidimensional input time series data in the embedding space is insufficient, and outputting an indication that the hypothesized relevancy of the label is incorrect.

This third aspect and other aspects can include one or more of the following features. Determining that the embedding of the multidimensional input time series data in the embedding space is insufficient can include determining that the embedding space has collapsed. Determining that the embedding of the multidimensional input time series data in the embedding space is insufficient can include determining differences between labels in the label time series and labels decoded from the multidimensional input time series data using the embedding. Determining that the embedding of the multidimensional input time series data in the embedding space is insufficient can include comparing embeddings produced using multidimensional input time series data from different sessions or from different subjects. Embedding the multidimensional input time series data in a latent embedding space can include embedding the multidimensional input time series data using a dimensionality reduction device, wherein the dimensionality reduction device was formed by the method of the first aspect.

In a fourth aspect, a method of identifying distinctive characteristics of a particular input time series can include performing the method of the first aspect to generate a baseline embedding of the reference samples, the positive samples, and negative samples into the common embedding space, embedding the particular input time series in the common embedding space, comparing the embedding of the particular input time series to the baseline embedding, and identifying the distinctive characteristics of the particular input time series based on a result of the comparison.

This fourth aspect and other aspects can include one or more of the following features. The method can include diagnosing a disease or degenerative state based on the distinctive characteristics of the particular input time series. The particular input time series can characterize electrical activity in the brain.

Other implementations of the above-described methods can include corresponding systems and apparatus configured to perform the actions of the methods, and computer programs that are tangibly embodied on machine-readable data storage devices and that configure data processing apparatus to perform the actions.

The details of one or more implementations of the subject matter are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 3:
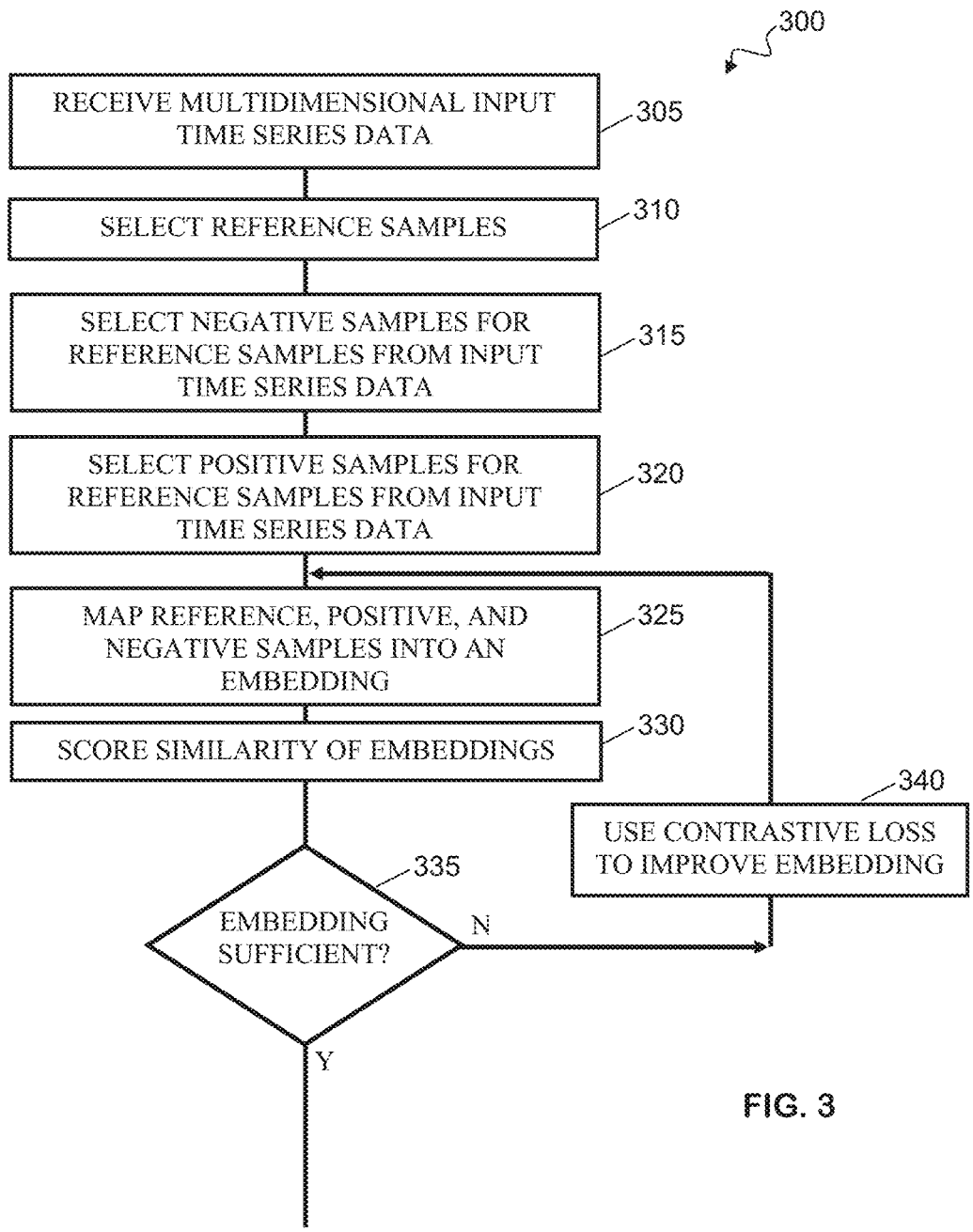

FIG. 3 is a flowchart that schematically represents a process 300 for reducing the dimensionality of a time-series. In particular, a relatively high dimensionality time-series can be translated or embedded into a lower-dimensional space. The lower dimensional space is itself referred to as an "embedding" or as an "embedding space." In some implementations, process 300 can be "discovery-driven" in that it is not necessary to label the data points in the time series prior to dimensionality reduction with labels from outside the time series. Rather, dimensionality reduction proceeds on the assumption that data points that are near in time are similar to each other. On the basis of this assumption, process 300 allows embeddings to be determined without requiring that a human or other user label particular data points with a preconceived notion of a link between the input data and the label. In effect, the labels are the times in the time series itself.

Process 300 can be performed by one or more data processing devices that perform data processing activities. The activities of process 300 can be performed in accordance with the logic of a set of machine-readable instructions, a hardware assembly, or a combination of these and/or other instructions. Process 300 can be performed in isolation or as part of a larger collection of data processing activities. For example, process 300 can be performed as part of a process for implementing brain machine interfaces. Brain machine interfaces can either interpret neural activity or stimulate neural activity using an embedding produced process 300. For example, neural activity can be interpreted to control a prosthetic device such as an artificial arm or leg. As another example, neural activity can be stimulated to convey (e.g., sensory) information into the brain or other neurons, e.g., from an artificial eye or ear. In these cases, the embedding be part of the translation between different representations of information, for example, the representation of a desired movement in neural activity and in the control signals of a prosthetic device or the representation of sensory input in pixels or amplitude/frequency and the representation in neural activity. Brain machine interfaces can be implemented in software that executes on a non-specific data processing device or in dedicated hardware, e.g., that includes on-chip computing capability.

As another example, process 300 can be performed for behavioral analysis during preclinical and clinical drug testing, as well as for offline analysis of the experimental data collected during drug testing. Other examples of activities that can be performed in conjunction with process 300 are described below.

At 305, the device performing process 300 receives a multi-dimensional input time series data. A time series is collection of data that characterizes one or more variables over time. When time series data has multiple dimensions, multiple variables are characterized. For example, referring to the electrical activity in FIG. 1, the electrical activity of each neuron is a variable and represents a dimension of the time series.

Typically, the data points in a time series are indexed in chronological order with an equal time period between data points. Also, the chronology of a time series typically corresponds to a real-world passage of time. However, these are not essential. For example, in some circumstances a time series may be indexed with uneven periods between data points and/or to artificial or variable measures of "time." As another example, in some instances, different variables or dimensions of the time series of may have different periods between data points.

At 310, the device performing process 300 selects reference samples from the input time series. A reference sample is a collection of data that occurs at a particular point in time or span of time during the duration of the input time series. Reference samples can also be referred to as "anchor samples" or "anchor pieces" and have features that are used as references for defining the similarity of other samples. For example, referring back to FIG. 1, a reference sample can be the electrical activity that is recorded at the 10 second mark or the electrical activity that is recorded at over a time span, e.g., from 9.8 seconds to 10.2 seconds. For the sake of brevity, both points in time and spans of time (distributions) are referred to herein as "times."

At 315, the device performing process 300 selects negative samples for each of the reference samples from the input time series data. Negative samples are also collections of data that each occur at times during the duration of the input time series. However, each negative sample is "negative" with respect to a particular reference sample in that a negative sample is expected to differ from (or be dissimilar to) that reference sample. In process 300, similarity or dissimilarity proceeds on the assumption that data that are near in time are similar to one another, whereas data that are far apart in time are dissimilar to one another. Again, with reference to the electrical activity in FIG. 1 and a reference sample that is recorded at the 10 second mark, electrical activity that is recorded at the 10.5 second mark can be taken as related to—and hence similar to—the reference sample, whereas electrical activity that is recorded at the 15 second mark can be taken as unrelated to—and hence dissimilar to—the reference sample.

The particular details of "near in time" and "far apart in time" will depend on the operational context. Factors such as the rate of change in the time series data and the time needed to acquire each data point in the time series data can be used to define whether a given sample is a positive and negative sample compared to another. Also, as discussed in more detail below, similarity and dissimilarity can also be judged based on other or additional factors (i.e., factors other than or in addition to time). For example, hypotheses regarding the similarity of collections of data can be used to characterize a sample as positive or negative.

In general, a relatively large number of negative samples can be selected for each reference sample. For example, in some implementations, the number of reference samples or "batch size" during training is 500 or more. With such batch sizes, one positive sample and one negative sample per reference sample may suffice. In such implementations, 500 or more reference samples will be compared to 500 or more positive samples. Also, 500 or more reference samples will be compared to each of the 500 or more negative examples. As an estimate, 500^2 comparisons will be made. Larger batch sizes are possible and even desirable for more complex datasets and models. In general, the sufficiency of a batch size can be judged based on the asymptotic convergence of the loss to a particular value as batch size increases. As discussed further below, the loss will generally be calculated using positive samples and negative samples that are drawn from different sessions and/or different subjects.

At 320, the device performing process 300 selects positive samples for each of the reference samples from the input time series data. Positive samples are also collections of data that each occur at a particular time or span of time during the duration of the input time series data. However, each positive sample is "positive" with respect to a particular reference sample in that a positive sample is expected to be similar to that reference sample. As discussed above, in process 300, similarity proceeds on the assumption that data that are near in time are similar to one another. Details regarding different approaches for selecting positive samples are presented in further detail below.

In more technical terms, the time series data received at 305 can be denoted as s(t). Each reference sample x selected at 310 belongs to a set of reference samples X, or x∈ X. Each positive or negative sample y belongs to a set of reference samples Y, or y∈ Y. Together, (x, y) form a positive or negative pair, based on the distribution from which y is sampled. Both the distribution and density functions of x can be denoted as the marginal density p(x). The positive pair distribution can be denoted as p(y|x) and to the negative pair distribution can be denoted as q(y|x).

At 325, the device performing process 300 maps features from the positive, negative, and reference samples into a common embedding space Z. This mapping extracts high dimensional values or "features" from the samples from the input time series data and encodes them in a lower dimensional space, namely, embedding space Z. Ideally, the features mapped into embedding space Z would retain the relevant information content of each of the samples and, at the same time, reduce or eliminate any irrelevant or redundant information notwithstanding the embedding space Z having a lower dimensionality that the samples themselves. The relevance of information is judged on the basis of whether it is possible to draw a conclusion with the information. The particular conclusion will be dependent on the operational context. The ability to draw a conclusion can be measured based on the differences between the conclusions drawn using the information in the high dimensional input time series data and the conclusions drawn using the information in the lower-dimensional embedding space Z.

In process 300, the same process for extracting and encoding features is used for all samples. In other words, the features of the samples are extracted into a common embedding space Z. In some implementations, feature extraction and encoding is implemented using a deep neural network with multiple layers. For example, multi-layer residual networks with Gaussian Error Linear Unit (GELU) activation functions can be used. For example, convolutional network with three or more layers with different receptive fields, varying dilation parameters, and using skip connections ("residual blocks") and smooth activation functions can be used. Other examples include transformer models for time-series or model architectures specifically tuned to the data modality of the time series. For instance, if images are as context information, a vision architecture (e.g., residual networks, vision transformer models, or the like) can be used.

At 330, the device performing process 300 scores the similarity of the reference, positive, and negative samples in the common embedding space Z. A variety of different functions can be used to score the similarity of the samples. For example, the similarity of samples can be scored using a cosine distance measure that measures the cosine of the angle between vectors of the features of the samples. As another example, the similarity of samples can be scored using, e.g., a Euclidean measurement of distance or the $L_p$ norm of the difference between the features of the samples.

For example, in technical terms, the similarity score ϕ of a vector u of features of a reference sample and a vector v of features of either a positive or negative sample can be scored using a flexible function $$\phi: Z \times Z \mapsto \mathbb{R} \qquad \text{EQUATION 1}$$

For example, the embedding space Z is a hypersphere and the similarity score ϕ between samples can be given by the cosine similarity $$\phi(u, v) = u^T v / (\|u\| \|v\|) \qquad \text{EQUATION 2}$$

As another example, the embedding space Z is Euclidean space and the similarity between samples can be given by the negative $L_p$ norm to the power of q, where a score of 0 corresponds to most similar examples, or:

$$\phi(u, v) = -\|u - v\|_p^q \qquad \text{EQUATION 3}$$

At 335, the device performing process 300 determines whether the embedding space Z into which the reference, positive, and negative are mapped is sufficient. The sufficiency of the embedding space can be determined, e.g., by determining whether an objective function that characterizes the representation of the reference, positive, and negative samples in the embedding space Z is sufficiently optimized. In general, the objective function is a loss function (also sometimes called a cost or error function) that represents the difference between the desired and actual mapping of the sample into the embedding space Z. For example, if the loss is below a threshold, then the embedding space Z can be considered sufficiently optimized. As another example, if the loss does not decrease further with additional samples, then the embedding space Z can be considered sufficiently optimized.

In an example implementation, assume that a reference sample x and positive/negative samples y are mapped into embedding space Z by feature extractors fx, fy. In other words, fx: X→Z and fy: Y→Z. The similarity $\psi$ of the mapping depends on the similarity score $\phi$, $$\psi(x, y) = \phi(f_X(x), f_Y(y))/\tau \qquad \text{EQUATION 4}$$

where $\tau$ is a temperature hyperparameter.

An objective function can be written as $$-\int_{x \in X} dx \ p(x) \left[ \int_{y \in Y} dy \ p(y|x)\psi(x,y) - \log \int_{y \in Y} dy \ q(y|x)\exp(\psi(x,y)) \right] \qquad \text{EQUATION 5}$$

With multiple negative samples, this objective function can be approximated by a loss function $$\mathop{\mathbb{E}}_{\substack{x \sim p(x), y_+ \sim p(y|x) \\ y_1,\ldots,y_n \sim q(y|x)}} \left[ -\log \frac{\exp(\psi(x, y_+))}{\exp(\psi(x, y_+)) + \sum_{i=1}^{n} \exp(\psi(x, y_i))} \right] \qquad \text{EQUATION 6A}$$

As another example, the objective function can be $$\mathop{\mathbb{E}}_{\substack{x \sim p(x), y_+ \sim p(y|x) \\ y_1,\ldots,y_n \sim q(y|x)}} \left[ -\psi(x, y_+) + \log \sum_{i=1}^{n} e^{\psi(x, y_i)} \right] \qquad \text{EQUATION 6B}$$

In other implementations, modified and other loss functions can be used. The loss function can be modified or selected based on the operational context. For example, the denominator of the loss function in Equation 6 can be modified to exclude the positive sample in the summation. It is also possible to replace the softmax cross-entropy by a sigmoid cross-entropy function. The InfoNCE loss function can also be used, as well as other loss functions that have similar properties including, e.g., Triplet losses, the Barlow Twins loss, and the like. Indeed, acceptable loss functions will encourage alignment of positive pairs and repel samples within the negative pairs.

When the embedding space Z is sufficient, the loss is sufficiently small to indicate that the difference between the desired and actual mapping of the sample into the embedding space Z is acceptable. In some implementations, other metrics can be used instead of or in addition to an objective function. For example, the accuracy with which context variables can be decoded from an embedding can be used to quantify the quality of the embedding. For example, differences between the original context variables and the decoded context variables can be used as a performance criterion. In some operational contexts, the accuracy with which context variable can be decoded may even be the preferred metric for judging the sufficiency of the embedding space Z. An example of a context where this may be the case is brain-machine interfaces (BMIs). As yet another example, the level of consistency of the embedding spaces Z formed using different sessions or with different subjects can be used to determine that the embedding spaces Z are acceptable. As yet another example, data from a single session or subject can be split, e.g., into arbitrary subsets. Each subset can used to generate a respective embedding space Z and the consistency of those embedding spaces Z can be used to determine the embedding spaces Z are acceptable.

At 340, the device performing process 300 uses a machine learning technique that is based on a contrastive loss to improve the mapping of the samples into an embedding space. The contrastive loss learns the parameters of a function that represents samples in an embedding space with similar samples relatively close together and dissimilar samples relatively further apart in the embedding. The mapping into an embedding space is improved by changing the parameters so that the loss function is reduced, i.e., similar samples are drawn closer together and dissimilar samples are repelled from one another. As a result, samples from the input time series becomes easier to classify or discriminate in the embedding space. Although learning is based on particular reference, positive, and negative samples, the learned embeddings should be widely applicable to other samples.

In some implementations, features from the dimensional space of the reference, positive, and negative samples are mapped directly into the embedding space. In other implementations, a projection head can be used to reduce the dimensionality of the samples prior to mapping. Thus, similarity will be scored and contrastive loss performed on the basis of the features output from the projection head. For example, the projection head can be a small (e.g., single hidden layer) perceptron that embeds the features of an input time series in a lower dimensional space. In some implementations, contrastive loss can also be used to improve the extraction of features by the projection head. In some implementations, the projection head can be discarded after it is learned how to map the reference, positive, and negative samples sufficiently well. In any case, the input time series becomes easier to classify or discriminate in the embedding space.

Example implementations of the projection head include $$\phi(u, v) = \sum_i \phi_i(u, v_i) \qquad \text{EQUATIONS 7-10}$$

$$\phi(u, v) = \sum_i \phi_i(u)\phi_i(v)$$

$$\phi(u, v) = \sum_i \phi_i(u)\phi_i(v_i)$$

$$\phi(u, v) = \sum_i \phi_i(u_i)\phi_i(v_i)$$

In these cases, the projection heads are parametrized by (residual) neural networks with a variable number of layers. Training with projection heads can result in an Euclidean embedding space Z and more flexibility in the embedding compared to learning without a projection head. This is particularly advantageous where the topology of the data is discovered rather than imposed by the choice of the metric.

After a sufficient mapping is learned, it can be applied in a variety of different application contexts. For example, an encoder or decoder that maps an input time series can reduce the dimensionality of multi-dimensional times series data similar to that received at 305. Then the encoder or decoder can be used in implementations like brain machine interfaces (BMI) to map neural data to intended actions and behavioral fingerprinting. For example, behavioral fingerprinting can be used to monitor for long-term behavioral changes elicited by, e.g., a pharmaceutical compound. As another example, the mapping can be used to discover previously-unsuspected relationships between different dimensions of the input time series. For example, the mapping can be used to map electrical activity in different brain regions to tasks. Indeed, the mapping need not rely upon any presumed relationship between the brain region and behavior. Rather, behavior associated with the brain region can be unknown. Using a hypothesis-driven approach, each measurable behavior label can be directly tested independently and in combination with other labels to measure the effect on embedding space Z.

Figure 4:
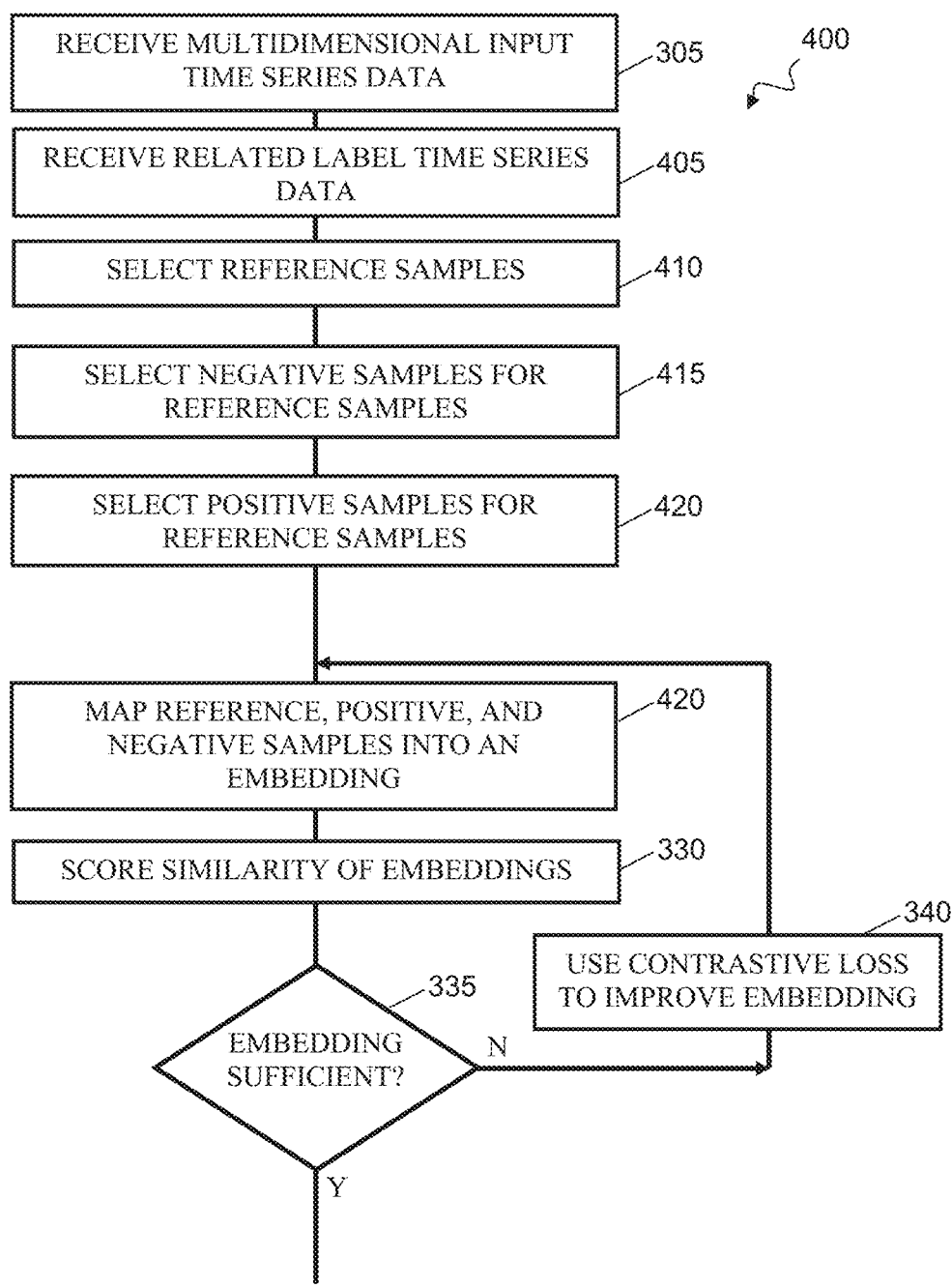
FIG. 4 is a flowchart that schematically represents a process for reducing the dimensionality of a time-series.

FIG. 4 is a flowchart that schematically represents a process 400 for reducing the dimensionality of a time-series. In some implementations, process 400 can be "hypothesis-driven" in that a hypothesis regarding a link between the embedding and the input variables can be tested. Like in process 300, the sufficiency of embeddings can be judged in several ways, e.g., when the loss is sufficiently small to indicate that the difference between the desired and actual mapping of the sample into the embedding space Z is acceptable. The sufficiency of an embedding thus tests for the existence of a hypothesized link between an input time series and labels for the data points in that time-series. An effective representation of the input time series in the lower-dimensionality space can support the conclusion that the hypothesized link is plausible. On the other hand, if a hypothesis is erroneous, an effective representation of the input time series will not be achieved and the training and validation loss curves do not show any learning. This stands in contrast with other machine learning techniques where the model would still train.

Process 400 can be performed by one or more data processing devices that perform data processing activities. The activities of process 400 can be performed in accordance with the logic of a set of machine-readable instructions, a hardware assembly, or a combination of these and/or other instructions. Process 400 can be performed in isolation or as part of a larger collection of data processing activities. For example, like process 300 (FIG. 3), process 400 can be performed to develop and implement brain machine interfaces, for behavioral analysis for preclinical and clinical drug testing, or for the other activities described below.

As another example, process 400 can be performed to identify labels that are relevant to or "space" high quality embeddings. In other words, the loss or other characterization of the sufficiency of different embeddings that are generated using different labels can be compared to identify the labels that are most relevant to the highest quality embeddings.

As another example, embeddings can be tested for consistency. Consistency can be tested across sessions, across subjects, and even within a single session by reordering portions of a time series. If data from different sessions or subjects or data in a different order yields the same or similar embeddings, then the embeddings can be considered consistent.

In addition to receiving multi-dimensional time series data at 305, the device performing process 400 receives related label time series data at 405. A label time series includes a collection of labels for the related multi-dimensional input data. The labels can be continuously-valued or discrete (e.g., categorical) values. The label time series is related to the multi-dimensional input data in that the labels characterize the same time periods or "sessions" as the input time series. The content of the labels within the label time series will depend on context. For example, referring to FIG. 2, the observed location of the rat to the left and right of a track can serve as a continuously-valued label time series for the related electrical activity in FIG. 1. As another example, a collection of time-indexed categorical labels characterizing the movement of the rat (e.g., "stopped," "moving to left," "moving to right," "turning") can serve as a label time series for the related electrical activity in FIG. 1. Such labels can be used to test hypotheses such as, e.g., the existence of a link between the location of the rat or the category of movement and the electrical activity. The label time series data has lower dimensionality than the related multi-dimensional time series data and, as discussed further below, the labels in a label time series data can be used to imbue domain knowledge into the selection of sample—and ultimately into the embeddings determined using those samples. In some cases, label time series data can also be referred to as a "context time series data" or "auxiliary time series data."

As an aside, the data in a single session characterize a continuous time period spanned by an input time series and—when present—a label time series. For example, referring back to FIGS. 1, 2, both the electrical activity and the location data span a single continuous time period and hence form a single session.

The data from a single session will typically relate to a single subject. For example, referring back to FIGS. 1, 2, the electrical activity will typically be measured in a single subject rat. However, this is not necessarily the case and, in some cases, a single session will relate to multiple subjects and the resulting embedding can result from multiple subjects using samples from those subjects. For example, the electrical activity from multiple rats could be recorded and labeled using common label data. For example, the rats could be subjected to the same sensory stimulus (e.g., light, sound, smells) and the concurrent electrical activity from the different rats and a label time series that characterizes the stimulus could all be jointly trained into a single embedding. This can be referred to as a pseudo-subject embedding. As another example, multiple sessions can be related to a single subject or to multiple subjects. The subjects need not be identical in all of the sessions.

As yet another example, individual sessions can be interrupted, i.e., there can be a pause or break in the time series. In some cases, portions of a time series before and after an interruption can be reordered. The interrupted individual sessions can be related to a single subject (e.g., recorded on different days) or to multiple subjects.

Returning to process 400, the device performing process 400 selects reference samples at 410. In contrast with the reference samples selected at 310 in process 300 (FIG. 3), the reference samples selected at 410 will include data from both the times series and the related label time series.

At 415 and 420 respectively, the device performing process 400 selects positive and negative samples. The positive and negative samples will include data from both the input time series and the label time series. The selection of the positive and negative samples can be based on data from the label time series, namely, similarity or dissimilarity of samples can be based at least in part on the labels in the label time series. For example, positive samples can be "positive" with respect to a particular reference sample in that the labels of positive samples are similar or identical to the label of the reference sample. Negative samples can be "negative" with respect to a particular reference sample in that the labels of negative samples differs from or are dissimilar to the label the reference sample.

However, other possible relationships between the labels of the positive and negative samples and the label of a reference sample can exist. For example, in some implementations, positive samples that have dissimilar labels from the label of a reference sample can be selected. Also, negative samples that have the same or similar labels from the label of the reference sample can be selected. As discussed further below, such an approach can be used to make an embedding invariant to the label.

In some implementations, similarity or dissimilarity is based on both data from the label time series and timing information. For example, positive samples can be "positive" with respect to a particular reference sample in that the samples are near in time to one another and the labels in the label time series have a certain relationship. Likewise, negative samples can be "negative" with respect to a particular reference sample in that the samples are far apart in time and the labels in the labels time series have a certain relationship.

In any case, by basing the selection of samples on the labels, a human user can imbue domain knowledge into the embeddings. In particular, a human user can enforce a label distribution of low-dimensional input data with an known structure into the higher-dimensions of the unknown (i.e., unlabeled) time series data. Even non-linear relationships between the dimensions of the high-dimensional input time series data can be identified. Indeed, high-dimensional input time series data from different subjects and/or different sessions can be used to generate embeddings that are consistent across those subjects and sessions by treating the subject identity and session identity as labels to which the embeddings are to be invariant.

At 420, the device performing process 400 maps the positive, negative, and reference samples into a common embedding space Z. The mapped features include information from both the multidimensional input time series and the label time series.

At 330, the device performing process 300 scores the similarity of the reference, positive, and negative samples in the common embedding space Z. The sufficiency of the mapping into the embedding space is determined at 335. If needed, a machine learning technique that is based on contrastive loss is used to improve the mapping at 340.

Figure 5:
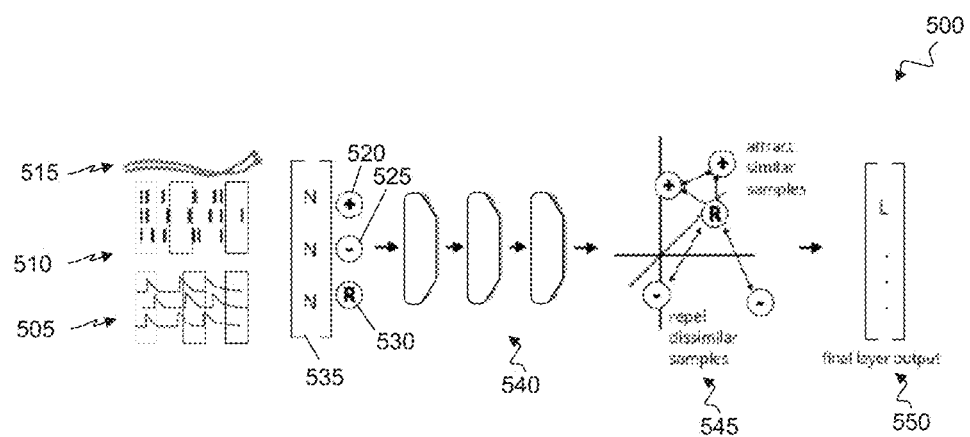
FIG. 5 is a flowchart that schematically represents a pipeline that implements a process for reducing the dimensionality of a time-series.

FIG. 5 is a schematic representation of a pipeline 500 that implements a process for reducing the dimensionality of a time-series. Pipeline 500 can be implemented in one or more data processing devices that perform data processing activities. The activities can be performed in accordance with the logic of a set of machine-readable instructions, a hardware assembly, or a combination of these and/or other instructions.

Pipeline 500 inputs one or more time series of data 505, 510, 515. Time series 505 and 510 each include multiple dimensions of data. For example, either or both of time series 505, 510 can be the multidimensional input time series received at 305 (FIGS. 3, 4). In the illustrated implementation, both time series 505, 510 are neural data of a subject. For example, time series 505 can represents fluorescence intracellular free calcium concentration recorded at different locations, whereas time series 510 can represent neuronal spikes (i.e., action potentials) recorded at different locations. Time series 515 includes one or more dimensions of continuously-varying data and can act as label time series that is received at 405 (FIG. 4). For example, time series 515 can be behavioral data and can represent, e.g., location, motion, or other behavior of the same subject. Assuming that time series 505, 510, 515 are all drawn from a single session, time series 515 can be used to label the data in time series 505, 510.

Positive samples 520, negative samples 525, and reference samples 530 are selected from one or more of time series 505, 510, 515 and represented in a collection of feature vectors 535. The feature vectors are input into a non-linear encoder, namely, a convolutional neural network 540 and mapped into a common embedding. Assuming it is necessary, contrastive learning 545 is used to improve the embedding produced by the non-linear encoder by attracting positive samples to the reference samples and repelling negative samples from the reference samples. The embedding can then be used to reduce the dimensionality of time series 505, 510, 515 or other time series and output a low-dimensionality embedding on an output layer 550.

As discussed above, both negative samples and positive samples must be selected for each respective reference sample. A variety of different approaches can be used to select the negative and positive samples. Further, sample selection can be tailored to the characteristics of the input time series and label time series. The selection of samples imbues domain knowledge into the embeddings and enforces a distribution of high-dimensional input time series data with an unknown structure into the lower-dimensions of the label time series data.

Figure 6:
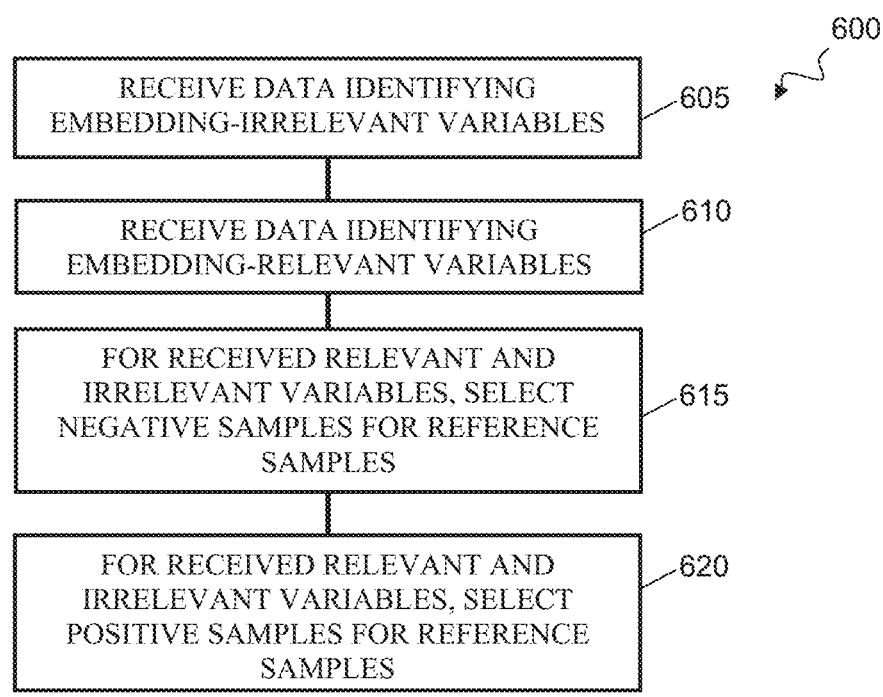
FIG. 6 is a flowchart that schematically represents a process for selecting positive and negative samples for a given reference sample.

FIG. 6 is a schematic representation of a process 600 for selecting positive and negative samples for a given reference sample. Process 600 can be performed by one or more data processing devices that perform data processing activities. The activities of process 600 can be performed in accordance with the logic of a set of machine-readable instructions, a hardware assembly, or a combination of these and/or other instructions. Process 600 can be performed in isolation or as part of a larger collection of data processing activities. For example, process 600 can be performed at 315, 320, 415, 420 of either of processes 300, 400 (FIGS. 3, 4).

The device performing process 600 receives data that identifies one or more embedding-irrelevant variables at 605. Embedding-irrelevant variables are variables of the label time series that are not to influence the mapping of the input time series data into an embedding space. In other words, the dimension(s) of the label(s) are to be—to the extent possible—irrelevant to the embedding. In an ideal world, only other variables would influence the mapping. Designation of a variable as embedding-irrelevant effectively enforces a uniform distribution of high-dimensional input time series data across the lower-dimension embedding-irrelevant label(s).

There are many reasons one could want to designate a variable as embedding-irrelevant. For example, the embeddings may be dominated by known variable. Rather than continuing to develop embeddings that are based on this known relationship, other embeddings that are based on other dimensions can be discovered or tested.

By way of example, suppose electrical activity data is collected from different subjects. The identity of the subject is a known variable that is likely to have a significant impact on the embedding. However, by enforcing an approximately uniform distribution of samples for the different subjects, the embeddings can become subject-invariant and reflect the commonalities of those different subjects. A comparable sample selection can be used to make the embedding invariant to session.

The device performing process 600 receives data that identifies one or more embedding-relevant variables at 610. Embedding-relevant variables are variables of the label time series that are affirmatively selected to influence the mapping of the input time series data into the embedding space. In other words, the embedding is to reflect the information content of the dimension of the label. Designation of a variable as embedding-relevant effectively enforces a non-uniform distribution of high-dimensional input time series data between positive and negative samples that are defined—at least in part—based on the lower-dimension embedding-relevant variable(s).

There are many reasons one could want to designate a variable as embedding-relevant. For example, as discussed above, a hypothesized link between a label and input data can be investigated. The precise nature of the hypothesized link can be used to define the samples that are selected and enforce a non-distribution of the high-dimensional of the input time series data.

The device performing process 600 selects negative samples for the given reference sample at 615 and positive samples for the given reference sample at 620. The selection is based at least in part on the identities of the embedding-irrelevant and embedding-relevant variables.

The following are examples of different approaches that can be used to select the positive and negative samples from various input and label time series. These examples can be performed as part or all of the sample selection at 315, 320, 415, 420 of either of processes 300, 400 (FIGS. 3, 4) and/or the sample selection at 615, 620 in process 600 (FIG. 6).

i. In some implementations, the input time series is unlabeled (i.e., there is no associated label time series) and generated during a single session. In this case, negative samples for a given reference can be selected at random from the negative pair distribution $q(y|x)$ for that session. In pseudocode,
  1: function Negative sampling from $q(y|x)$
  2: sample j~uniform([T]) >Approximately sample a uniform distribution
  3: return j
  4: end function ii. As another example, in some implementations, an input time series and related label time series for a single session are received. Further, the label time series is categorical and different time periods spanned by the input time series are labeled with discrete categorical labels $k(t)$ that belong to a set of possible labels K. In technical terms, $k(t) \in K$.

In instances where the learning embedding is to be invariant with respect to the categorical label $k(t)$, both negative samples and positive samples are selected to approximate a uniform distribution over the different possible labels. A normalized histogram of the labels in the label time series can be generated and positive and negative samples can be selected for each categorical label $k(t)$ according to the probability of that label occurring during the session. In pseudocode,
  1: function Uniform negative sampling from $q(y|x)$
  2: $h_i \leftarrow |\{t \in [T]: k(t)=i\}|/T$ >Compute normalized histogram $h_i$ of labels
  3: sample j~uniform([0,1]) >Approximately sample a uniform distribution
  4: find smallest $\tau$ such that $(\Sigma_{t=1}^{\tau} h_{k(t)}) \geq j$
  5: return $k(\tau)$
  6: end function iii. As another example, in some implementations, the label time series includes discrete categorical labels, i.e., the label time series is given by $k(t)$ with categorical values that belong to a set of possible categorical labels K. A candidate set C of possible positive samples can be defined for each categorical label $k(t)$. In instances where the learning embedding is to vary with respect to the categorical label $k(t)$, each positive sample can be required to have the same categorical label $k(t)$ as the categorical label $k(t)$ of the reference sample. The positive samples can be selected from the candidate set C for this categorical label $k(t)$ with a uniform distribution. In pseudocode,
  1: function Positive sampling from $p(y|x)$, given reference sample i
  2: $C=\{t \in [T], k(t)=k(i)\}$ >Define candidate set of possible positive samples with same categorical label
  3: sample j~uniform(C) >Sample from candidate set, approximately uniformly
  4: return j
  5: end function iv. As another example, in some implementations, the time series is labeled with continuous labels given by a continuously-varying label time series $c(t)$. Both the input time series and label time series are from a single session and the values in the label time series $c(t)$ are to be embedding-relevant.

Figure 2:
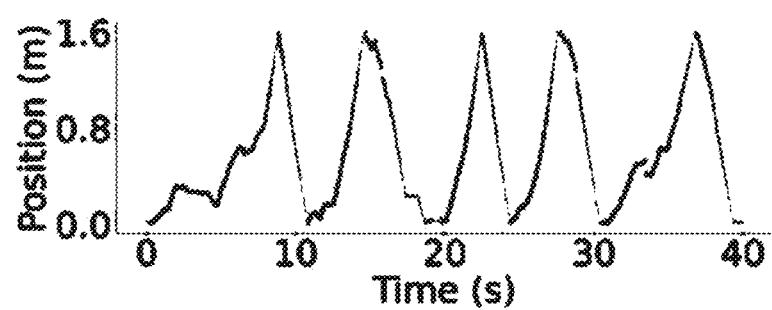
FIG. 2 is a graph that represents the observed location of that same rat to the left and right of a track.

As discussed above, positive samples are "positive" with respect to a particular reference sample in that a positive sample is expected to be similar to the reference sample. A simplistic way to define similarity with a continuous label time series $c(t)$ would be to require that the value of the label of positive samples be the same (or nearly the same) as the value of the label of a reference sample. Referring to FIG. 2, one could simply draw a horizontal line at a particular position and designate every intersection with the plot as a similar, positive sample of a reference sample with the same positional value. For example, for a reference sample that occurs at a time of 10 sec, samples that occur at approximately 5 second, 13 second, 17 seconds, 22 seconds, 24 seconds, 26 seconds, 30 seconds, and 39 seconds could be selected as positive samples based on the shared location of approximately 0.7 meters.

However, in implementations of the present invention, similarity is defined with respect to the typical changes in the continuous values of the label time series over time, rather than the values themselves. In particular, an empirical conditional distribution $P(c(t+\tau)|c(t))$ can be generated from the label time series $c(t)$ to represent how the time series $c(t)$ generally varies over time. For example, the values of the label time series $c(t)$ at a collection of different times $t_0$ can be taken as initial values. The values of the label time series $c(t)$ at a collection of different times $t_0+\tau$ can be taken as final values. The differences between $c(t_0)$ and $c(t_0+\tau)$ can be collected into different sets $\Delta$ that embody the typical changes in the values of the label time series $c(t)$ after one or more time increments $\tau$. In other words, one set $\Delta$ of differences can be generated for each time increment $\tau$. Once again, the changes in value in each set $\Delta$ are empirical, i.e., they are observed in the label time series $c(t)$ itself.

The sets $\Delta$ of typical changes in the values of the label time series $c(t)$ can then be used to identify positive samples that occur at times other than the time of the reference sample and comport with the typical variation in the label time series. In particular, for a given reference sample i, a number of subsequent later samples can be scanned to identify at least one that has a value which most closely embodies the typical changes present in the label time series $c(t)$.

In technical terms, a particular time increment $\tau$ can be defined to indicate a time difference between the reference sample and a set of candidate samples. For example, for a reference sample that occurs at time of 1 second, a set of candidate positive samples that occur at different time increments $\tau$ (e.g., 0.2, 0.4, 0.6, . . . seconds) after the reference sample can be defined. Further, a set $\Delta$ that embodies the typical changes in the values of the label time series c(t) can be identified for each time increment τ, i.e., c(t+τ). A positive sample that has a value c(t+τ) that most closely matches the typical changes for that time increment τ can be selected.

In pseudocode,
1: function Positive sampling from p(y|x), given reference sample i
2: D={t∈[T], τ∈Δ: c(t)−c(t+τ)} >where D represents variation in the context data for a number of different possible time offsets τ belonging to a set of time offsets Δ
3: sample d~uniform(D) >obtain the variations in context data
4: j←arg min$_{τ∈[T]}$∥c(i)+d−c(τ)∥ >select, as positive sample, the sample that occurs at a τ that best matches the variation
5: return j
6: end function Rather than building a set D that represents variation in the context data for a number of different possible time offsets τ, it is also possible to select possible samples for a single time offset τ. In this case, values of the label time series c(t) can be identified for the particular time increment τ. The values can be sampled uniformly across the time series and a set Δ for that the particular time increment τ can be generated. Once again, a positive sample that has a value c(t+τ) that most closely matches the typical changes for that time increment τ can be selected.

In pseudocode,
1: function Positive sampling from p(y|x), given reference sample i
2: sample τ~uniform(Δ) >obtain the time difference
3: c'=c(i+τ) >obtain the time difference
4: j←arg min$_{τ∈[T]\(i+tau)}$∥c(i)−c'∥ >select, as positive sample, the sample that best matches the variation
5: return j
6: end function These last two examples all select positive samples using "subjective" measures of similarity in that similarity is judged based on characteristics of the continuously-varying label time series c(t) itself. In effect, a positive example is positive if it comports with expectations established by other (generally, empirically-measured) labels in the continuously-varying label time series c(t).

However, this is not necessarily the case and, in some implementations, positive samples can be selected using "objective" measures of similarity that are defined independently of the continuously-varying label time series c(t). For example, a human user could explicitly establish the expectations used to identify positive samples.

By way of example, suppose that the label c defines location. An objective measure of expectations (e.g., a Gaussian distribution with a certain variance centered around c(i)) can be used to characterize similarity.

In one implementation, in pseudocode:
1: function Positive sampling from p(y|x), given reference sample i
3: obtain c'~p(c'|c(i)) >obtain objective variation in context data
4: j←arg min$_{τ∈[T]}$∥c'−c(τ)∥ >select, as positive sample, the sample that occurs at a τ that best matches the objective variation
5: return j
6: end function v. As another example, in some implementations, positive samples can be selected based on two different label time series from a single session—namely, a time series c(t) with continuous-varying labels and a time series k(t) with discrete categorical labels. The values in both c(t) and k(t) are to be embedding-relevant.

Once again, similarity as to the continuous-varying labels can be defined with respect to the typical variation in the continuous values of the label time series. Further, the categorical values can be used as an additional filter to define positive samples. In particular, for a given reference sample i, a sample that occurs at a time increment τ and most closely matches the typical variation over that time increment is checked to ensure that it belongs to the same category. The sample is selected as a positive sample if and only if it does.

In pseudocode,
1: function Positive sampling from p(y|x), given reference sample i
2: D={t∈[T], τ∈Δ: c(t)−c(t+τ)} >where D represents variation in the context data for a number of different possible time offsets τ belonging to a set of time offsets Δ
3: sample d~uniform(D) >obtain the variations in context data
4: j←arg min$_{τ∈[T]}$∥c(i)+d−c(τ)∥ >select, as positive sample, the sample that occurs at a τ that best matches the variation
5: return j
6: end function
7: function distance (i, j, d)
8: if k(i)≠k(j) then
9: return +∞
10: else
11: return ∥c(i)+d−c(τ)∥
12: end if
13: end function vi. As yet another example, positive samples can be selected based on two different label time series from a single session—namely, a time series c(t) with continuous-varying labels and a time series k(t) with discrete categorical labels. In contrast with the immediately preceding approach, the positive samples can be selected to ensure that the embedding is invariant to the categorical labels in the time series k(t), i.e., the categorical labels in the time series k(t) are embedding-irrelevant.

Once again, similarity as to the continuous-varying labels can be defined with respect to the typical variation in the continuous values of the label time series. However, rather than using the categorical values as a filter, the categorical values can be used to drive selection of positive samples that are approximately evenly distributed across the different categorical values.

In pseudocode,
1: function Positive sampling from p(y|x), given reference sample i
2: D={t∈[T], τ∈Δ: c(t)−c(t+τ)} >where D represents variation in the context data for a number of different possible time offsets τ belonging to a set of time offsets Δ
3: sample d~uniform(D) >obtain the variations in context data
4: sample k~Uniform negative sampling from q(y|x)
5: j←arg min$_{τ∈[T]}$ distance (i, τ, d, k) >select, as positive sample, the sample that occurs at a τ that best matches the variation
5: return j
6: end function
7: function distance (i, j, d, k)
8: if k(i)≠k then
9: return +∞

10: else
11: return $\|c(i)+d-c(\tau)\|$
12: end if
13: end function vii. As yet another example, positive samples can be selected from multiple sessions, each of which has a time series of continuous-varying labels. In contrast with sampling from single sessions, the empirical conditional distribution $P(c(t+\tau)|c(t))$—or one of the alternative definitions in iv)—can be generated from the label time series c(t) of the different sessions. In other words, each set $\Delta$ of typical changes in values will include values from multiple time series c(t). Nevertheless, the sets can be used to identify positive samples that occur within the same time series as the reference and comport with the typical variation across the different sessions. At least one reference sample $i_l$ will be selected for each session l of the set of sessions L.

In pseudocode,
1: function Positive sampling from p(y|x) given a reference sample $\{i_l\}_{l=1}^{L}$
2: $D=\{t\in[T], l\in L, \tau\in\Delta: c_l(t)-c_l(t+\tau)\}$
3: for $l\in L$ do
4: sample $d_l\sim$uniform (D)
5: $j_l\leftarrow$arg $\min_{\tau\in[T]}\|c(i_l)+d-c(\tau)\|$
6: end for
7: return $\{j_l\}_{l=1}^{L}$
8: end function Likewise, other than drawing negative samples from different sessions, negative sampling for multi-session training need not differ from single-session negative sampling. For example, negative samples can be drawn with uniform timesteps in each of the different session. In some implementations, resampling can be used to force a uniform distribution over a label within each session. In general, the same number of negative samples is drawn for each session.

viii. Other variations of the aforementioned approaches to selecting samples are possible. For example, selection of a positive and negative samples in the approaches described above generally contain the selection step 1: $j\leftarrow$arg $\min_{\tau\in[T]}$ distance(query, c($\tau$))
using the "argmin" function to select the index using a distance function and a query vector.

This general form can be implemented in several variations. For example, for the distance function, Lp norms $\|.\|$ are used above. In other implementation, other metrics can be used for the distance function. For example, a cosine loss can be used. The particular distance function can be selected based on the label time series data c(.). As another example, the arg-min function can be replaced by a "soft" selection criterion. The argmin deterministically chooses the sample c($\tau$) with shortest distance to the query. In some implementations, for example in the approach described in section iv above, sampling can be performed from the distribution of distances. This can be expressed in pseudocode 1': $p_j\leftarrow$probability(distance(query, c($\tau$)))
2': $j\leftarrow$sample([T], with probability p($\tau$) for sample $\tau$)
where the probability is a function converting distances into probabilities. For example, the following implementation
1'': $p(\tau)\leftarrow\exp(-\|query-c(\tau)\|^2/s^2)$
2'': $p(\tau)\leftarrow p(\tau)/$sum over $\tau$ $p(\tau)$
3'': $j\leftarrow$sample([T], with probability p($\tau$) for sample $\tau$)
evaluates the distance according to a Gaussian probability density function with standard deviation s, and samples j accordingly. Note, for very small values of s, this selection function becomes equivalent to the arg-min selection in the approach described above.

Figure 7:
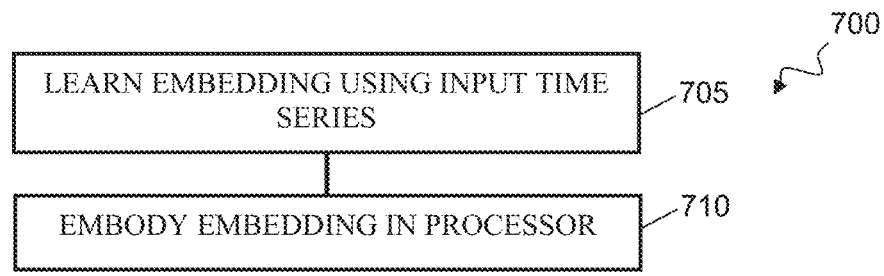
FIG. 7 is a flowchart that schematically represents a process for producing a device that either generates one or more labels from an input time series or generates one or more variables of an input time series from a label time series.

FIG. 7 is a flowchart that schematically represents a process 700 for producing a device that either generates one or more labels from an input time series or generates one or more variables of an input time series from a label time series. Process 700 can be performed by one or more data processing devices that perform data processing activities. The activities of process 700 can be performed in accordance with the logic of a set of machine-readable instructions, a hardware assembly, or a combination of these and/or other instructions. Process 700 can be performed in isolation or as part of a larger collection of data processing activities. For example, processes 300, 400 (FIGS. 3, 4) can be performed as part of process 700.

The device performing process 700 learns an embedding using one or more input time series at 705. For example, the embedding can be learned using either of processes 300, 400 (FIGS. 3, 4). In the learning process, the sufficiency of the embedding for performing a particular task can be tested. In other words, the sufficiency of the embedding for interpreting input time series or generating variables of input time series can be tested against one or more performance metrics that are tailored to the operational context in which the produced device is to be employed.

The device performing process 700 embodies the embedding in one or more data processors at 710. For example, the embedding can be embodied in software that executes on a non-specific data processing device, in dedicated hardware, or in combinations of these and other data processing functionality.

The data processor(s) in which the embedding is embodied include inputs for receiving either additional input time series (i.e., input time series other than the input time series used to learn the embedding) and/or label time series. In some implementations, the input time series and/or the label time series include measurement information that characterizes physical reality, although this is not necessarily the case.

In some implementations, the inputs can include one or more inputs from a transducer that generates a input time series data and/or a label time series that reflects physical reality. In other implementations, the data processor(s) in which the embedding is embodied do not include inputs from a transducer. Rather, measurement results are received either directly or indirectly from a device that does. The inputs can be, e.g., part of a data communication interface.

In some implementations, the data processor(s) in which the embedding is embodied include signal and/or other processing functionality (e.g., filters, amplifiers, buffers, data communication hardware) that prepare measurements of physical reality for mapping by the particular implementation of the embedding. In other implementations, the processor(s) do not provide such processing functionality. Rather, such processing functionality can be provided by another device from which the processor(s) can receive processed measurements for input.

In general, the data processor(s) in which the embedding is embodied includes outputs for outputting labels, variables of the input time series, or both labels and variables. In particular, when an input time series is to be interpreted, the processor(s) include outputs that are configured to output labels. In contrast, when an input time series is to be generated, the processor(s) includes outputs that are configured to output variables in the input time series used to learn the embedding.

In some implementations, the outputs can act directly upon physical reality. For example, mechanical devices (e.g., prostheses) can be driven or controlled or neurons can be depolarized. In some implementations, the outputs can convey signals to another device that directly acts upon physical reality In some implementations, the outputs can provide signal and/or other processing functionality that prepare labels or variables from the input time series used to learn the embedding for output.

The data processor that embodies the embedding can be used to either generate one or more labels from an input time series or generate one or more variables of an input time series from a label time series.

Figure 8:
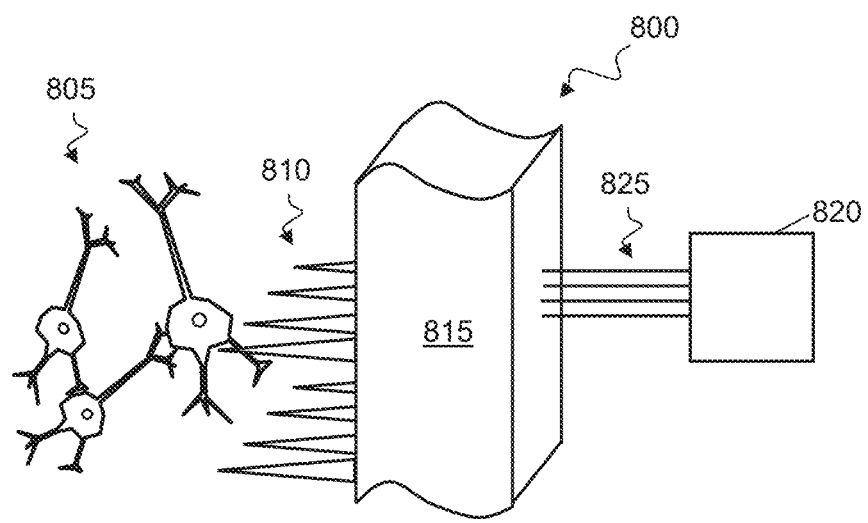
FIG. 8 is a schematic representation of an example device that embodies an embedding and that can be produced using the process of FIG. 7.

FIG. 8 is a schematic representation of an example device 800 that embodies an embedding and that can be produced using process 700 (FIG. 7). Device 800 is a brain-machine interface and either generates labels for electrical activity observed in a collection 805 of neurons or generates output signals that embody variables in the input time series used to learn the embedding for injection into the neurons of collection 805. The neurons in collection 805 can be, e.g., in the brain, in the spinal cord, or in a nerve bundle (e.g., in the optic nerve).

Device 800 includes a collection of electrodes 810 and a body 815. Electrodes 810 are conductors that are configured to transduce or to stimulate electrical activity in the neurons of collection 805. Body 815 provides mechanical support to electrodes 810. In the illustrated implementation, body 815 also includes one or more processors in which the embedding is embodied. For example, body 815 can include one or more integrated circuits that embody the embedding. The body 815 can also include circuitry that provides functionality for either transducing or generating electrical activity in collection 805 and for communicating with a machine 820 over a data communication path 825.

Machine 820 is a device that is configured to either generate label time series by transducing physical reality or to process labels that characterize the electrical activity in collection 805. For example, in implementations where machine 820 is to transduce physical reality, machine 820 can include optical, acoustic, temperature, chemical, mechanical, or other sensors. In implementations where machine 820 is to process labels, machine 820 can include mechanical, electrical, optical, acoustic, or other outputs that reflect the information content of the labels. For example, in implementations where machine 820 is a mechanical prosthesis, machine 820 can output mechanical movements that reflect the translation of the electrical activity measured by electrodes 810 using the embedding. As another example, machine 820 can be a display screen, a speaker, a printer, or other output device that outputs, e.g., images, sounds, text, or the like that reflects the translation of the electrical activity measured by electrodes 810 using the embedding.

Data communication path 825 can be either wired or wireless. Both machine 820 and body 815 can include suitable data communication interfaces.

Figure 9:
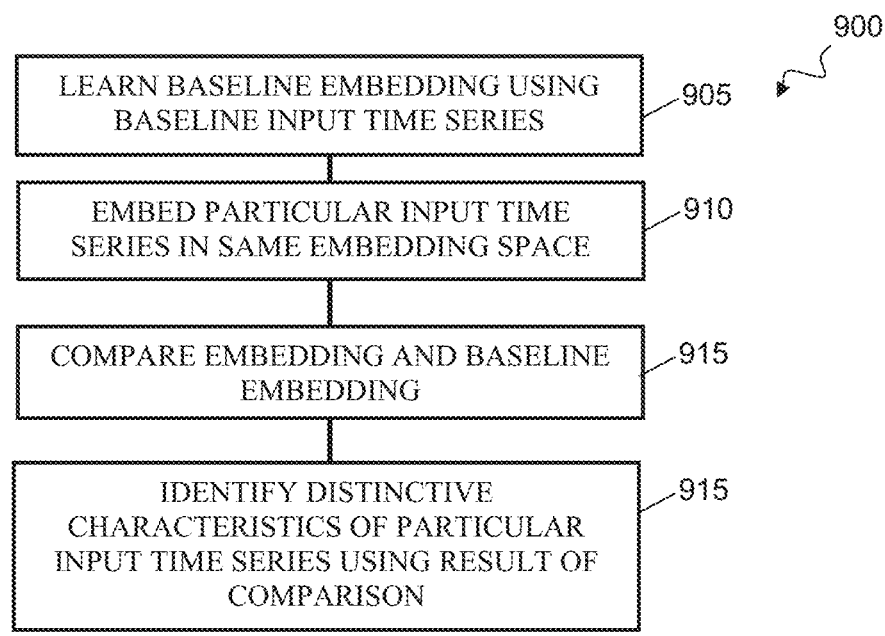
FIG. 9 is a flowchart that schematically represents a process for identifying peculiarities or other distinctive characteristics of a particular time series data.

FIG. 9 is a flowchart that schematically represents a process 900 for identifying peculiarities or other distinctive characteristics of a particular time series data. The distinctive characteristics are characteristics of the time series data that differ from a (generally, much larger) collection of other time series data. The particular time series data can be input time series data, label time series data, or both. The embedding of the particular time series data can be compared with a baseline embedding in the same embedding space. Since dimensionality reduction isolates dimensions that are indicative of links and discards or ignores dimensions that are irrelevant or less relevant, the comparison is directed to the relevant dimensions. Dimensions of the input time series data that are irrelevant or redundant can be ignored at the same time that the dimensions that include the most relevant information content can be compared.

Process 900 can be used in a variety of contexts and the nature of the distinctive characteristics will depend on those contexts. For example, when process 900 is used to diagnose disease or degenerative states, the distinctive characteristics can be characteristics of the function of an organ or behavior of an individual in comparison to a collection of healthy individuals. As another example, when process 900 is used to diagnose, e.g., a learning disability, the distinctive characteristics can be characteristics of the electrical activity in the brain of an individual in comparison to a collection of individuals without the disability.

Process 900 can be performed by one or more data processing devices that perform data processing activities. The activities of process 900 can be performed in accordance with the logic of a set of machine-readable instructions, a hardware assembly, or a combination of these and/or other instructions. Process 900 can be performed in isolation or as part of a larger collection of data processing activities. For example, processes 300, 400 (FIGS. 3, 4) can be performed as part of process 900.

The device performing process 900 learns a baseline embedding using one or more baseline input time series at 905. For example, the baseline embedding can be learned using either of processes 300, 400 (FIGS. 3, 4). In general, a baseline embedding will be learned using a relatively large collection of baseline input time series data. In general, a baseline embedding will be learned e.g., from long sessions, from multiple sessions, from multiple subjects, or from combinations of such input time series data.

The device performing process 900 embeds a particular input time series into the same embedding space as the baseline embedding at 910. The same features that were more relevant to representing the baseline input time series are extracted from the particular input time series and represented in the embedding space. To extract the same features, the dimensionality of the particular input time series is generally the same as the dimensionality of the baseline input time series data. For example, if the baseline input time series data includes data recorded from 120 neurons in the brain of a rat, the particular input time series will generally also include data recorded from same 120 neurons in the brain of a rat.

In general, the duration of particular input time series will be shorter than the duration of the baseline input time series. However, this is not necessarily the case. For example, the particular input time series can span the same duration or even a longer duration than the baseline input time series.

In general, the particular input time series will include data from a particular instance of interest. For example, the particular input time series can include data from a single session or from a single subject. However, this is not necessarily the case. For example, the particular input time series can include data from a collection of instances. The collection of instances may be, e.g., multiple sessions and/or multiple subjects that are somehow related. For example, in the context of behavioral analysis during preclinical and clinical drug testing, the particular input time series include data from multiple sessions and/or multiple subjects, e.g., when seeking to investigate the effectiveness of the drug.

In general, the particular input time series will not be part of the baseline input time series and will not contribute the learning of the baseline embedding. However, this is not necessarily the case. For example, the particular input time series could be included in the baseline input time series, e.g., one input time series of a thousand baseline input time series or a small duration within an extended-duration single session.

The device performing process 900 compares the embedding of the particular input time series and the baseline embedding within the baseline embedding space at 915. The results of the comparison can be expressed as a distance along one or more dimensions between the embedding and the baseline embedding within the common embedding space.

The device performing process 900 identifies peculiarities or other distinctive characteristics of the particular time series data based on the results of the comparison at 920. The distinctive characteristics are characteristics of the particular time series data that differ from characteristics of the baseline time series data. In some implementations, the distinctive characteristics can be identified by translating the results of the comparison performed at 915 back into the dimensional space of the particular and baseline time series data.

EXAMPLE RESULTS

Rat Hippocampus Dataset

Figure 1:
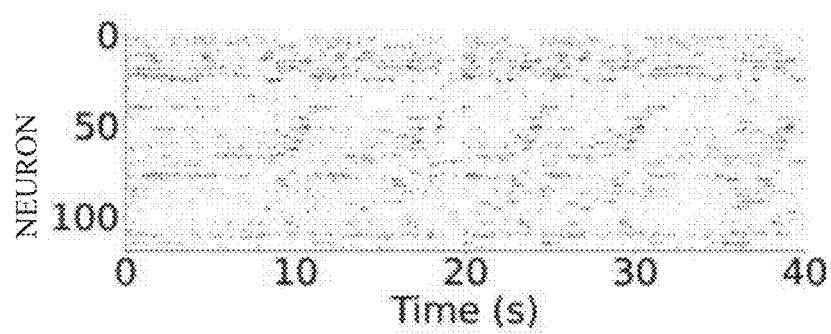
FIG. 1 is a graph that represents the electrical activity from 120 neurons recorded by electrodes that were implanted in the hippocampus of a rat.

Eight bilateral silicon-probe multi-cellular electrophysiological recordings performed on four male Long-Evans rats hippocampus CA1 were used from the work of Grosmark et al. (Science 351 (6280), p. 1440-1443 (2016)). During a session, each rat independently ran on a 1.6 m wooden track and they were rewarded with water at each end of the track. The numbers of recorded putative pyramidal neurons for each rat ranged between 48 to 120. The data is shown in FIGS. 1 and 2. Prior to dimensionality reduction, the spikes were binned into 25 ms time windows and the corresponding positions of rats were calculated with rolling maximum. Position and running direction of rat were encoded in 3D vectors that included a continuous position value and two binary values indicating right or left direction. The recording of each rat was split into train, validate, and test set with k=5 nested cross validation scheme for decoding task.

Figure 10:
FIG. 10 are two-dimensional representations of a five-dimensional embedding of the rat data from FIGS. 1, 2.

FIG. 10 are a two-dimensional representations of a five-dimensional embedding of the rat data from FIGS. 1, 2. The embedding on the left was generated using supervised learning, namely, using the position and direction of the rat as a label time series in an implementation of process 400 (FIG. 4). In the implementation that resulted in this embedding, the temperature hyperparameter τ in Equation 4 was 1, the time offset was 10, the batch size or 512, and 10 k training steps were performed. A confusion matrix that depicts the $R^2$ after fitting a linear model between behavior-aligned embeddings of two animals is as follows:

TABLE 1

| | | | | |
|---|---|---|---|---|
| Rat 1 | — | 97 | 94 | 93 |
| Rat 2 | 97 | — | 94 | 92 |
| Rat 3 | 96 | 96 | — | 91 |
| Rat 4 | 95 | 96 | 91 | — |
| | Rat 1 | Rat 2 | Rat 3 | Rat 4 |

The values shown in the matrix are the mean across 10 runs.

Returning to FIG. 10, the embedding on the right was generated using unsupervised learning, namely, only using electrical activity as an input time series in an implementation of process 300 (FIG. 3). In the implementation that resulted in this embedding, the temperature hyperparameter τ in Equation 4 was 1, the time offset was 10, the batch size or 512, and 4k training steps were performed. A confusion matrix that depicts the $R^2$ after fitting a linear model between behavior-aligned embeddings of two animals is as follows:

TABLE 2

| | | | | |
|---|---|---|---|---|
| Rat 1 | — | 76 | 79 | 86 |
| Rat 2 | 81 | — | 75 | 70 |
| Rat 3 | 77 | 73 | — | 68 |
| Rat 4 | 91 | 73 | 75 | — |
| | Rat 1 | Rat 2 | Rat 3 | Rat 4 |

As shown, embedding consistency was high across different subjects and multiple runs. Further, highly-decodable embeddings were produced.

Mouse Visual Cortex Datasets from the Allen Brain Observatory

Frame-by-frame video features can be used as label time series of sensory input to extract the neural latent space of the visual cortex of mice that are watching movies. In particular, a vision transformer architecture DINO described by Caron et al. (Emerging properties in self-supervised vision transformers. ArXiv, abs/2104.14294 (2021) can be used to extract the visual latent features from a movie on a frame-by-frame basis. The extracted latent visual features of a black-and-white movie can then serve as a continuous label time series in an implementation of process 400 (FIG. 4)

For the input time series data, 2-photon calcium imaging and Neuropixels recordings from mouse primary visual cortex during presentation of the black-and-white movie with 30 Hz frame rate can be used. These are described by de Vries et al. (Nature Neuroscience, 23(1) p. 138-151 (2020)) and Deitch et al. (Current Biology, 31(19) p. 4327-4339 (2021)). For calcium imaging, a processed dataset from de Vries et al. (Nature Neuroscience, 23(1) p. 138-151 (2020)) and Siegle et al. (Nature: 592, p. 86-92 (2021)) with a sampling rate of 30 Hz, aligned to the video frames, and be used. The recordings of excitatory neurons in the "Visual Coding-2P" dataset were used. Ten repeats of the first movie were shown in all session types (A,B,C) for each mouse and the neurons which were recorded in all three session types were used. The neurons were found using cell registration as described in de Vries et al. (Nature Neuroscience, 23(1) p. 138-151 (2020)). Preprocessed spike-timings were binned to a sampling frequency of 120 Hz and aligned with the movie timestamps. In particular, exactly 4 bins were aligned with each frame. The dataset contains recordings for 10 repeats and the identical movie that was used for the calcium recordings.

Figure 11:
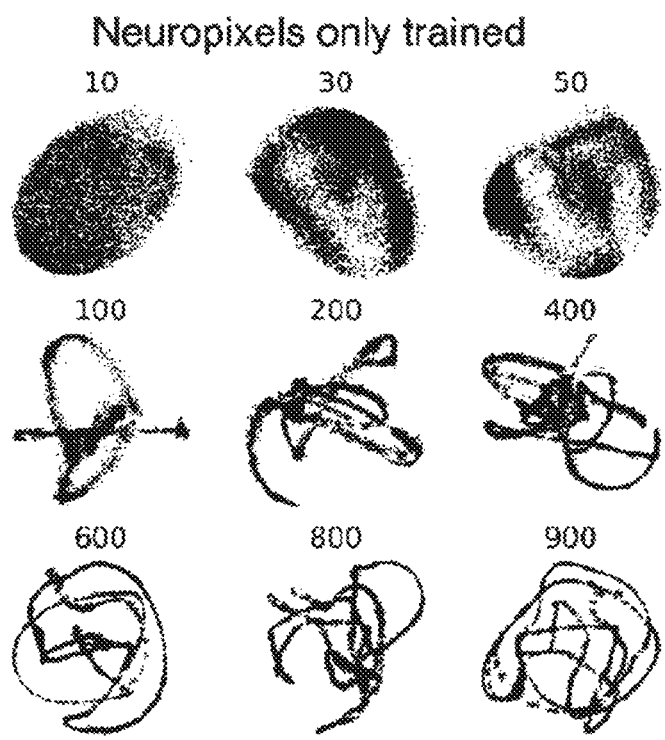
FIG. 11 are two-dimensional representations of eight-dimensional embeddings of neural data recorded with Neuropixel probes during viewing.
Figure 12:
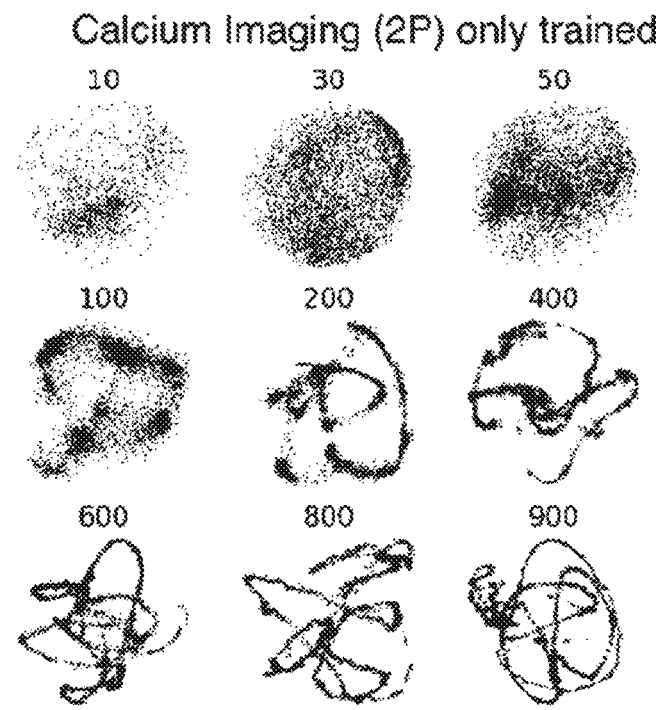
FIG. 12 are two-dimensional representation of eight-dimensional embeddings of 2-photon (2P) microscope during viewing.
Figure 13:
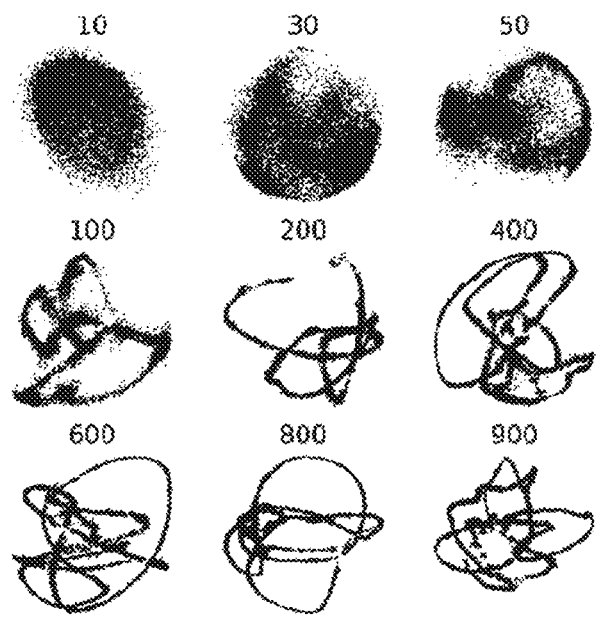
FIGS. 13, 14 are two-dimensional representations of eight-dimensional embeddings learned using both the Neuropixel probes neural data and the 2-photon (2P) microscope neural data, respectively.
Figure 14:
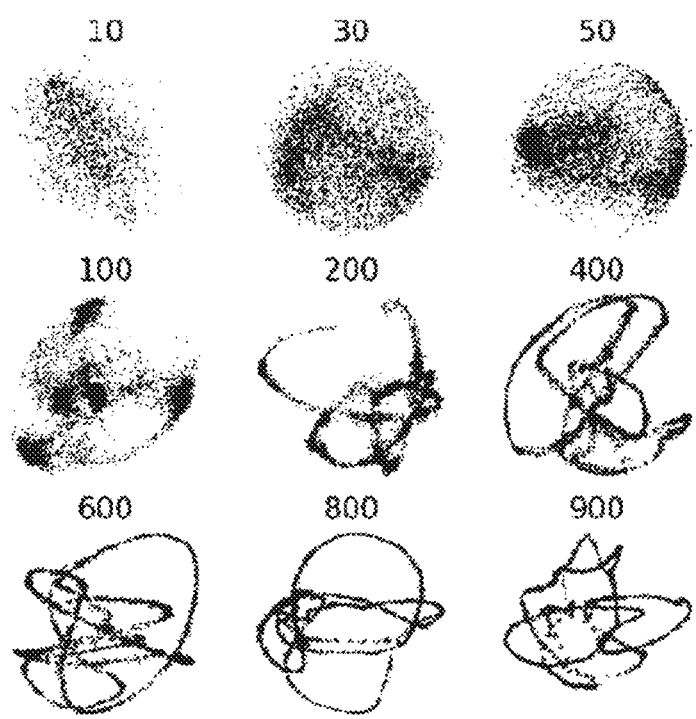

FIG. 11 are two-dimensional representations of eight-dimensional embeddings of neural data recorded with Neuropixel probes during viewing. FIG. 12 are two-dimensional representation of eight-dimensional embeddings of 2-photon (2P) microscope during viewing. The numbers on top of each embedding is the number of neurons subsampled from the multi-session concatenated dataset. FIGS. 13, 14 are two-dimensional representations of eight-dimensional embeddings learned using both the Neuropixel probes neural data and the 2-photon (2P) microscope neural data, respectively. Once again, the numbers on top of each embedding is the number of neurons subsampled from the multi-session concatenated dataset. As shown, consistency between the embeddings is high—even when the embeddings are learned using different recording modalities. Further, the consistency of the embeddings with joint training is very high.

Figure 15:
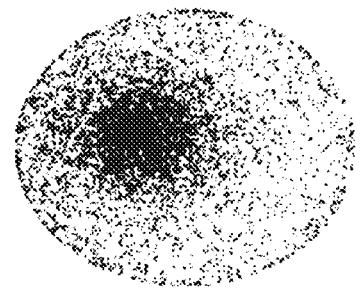
FIG. 15 is a two-dimensional representation of a five-dimensional embedding of the rat data from FIGS. 1, 2 when a hypothesized embedding was erroneous.

FIG. 15 is a two-dimensional representation of a five-dimensional embedding of the rat data from FIGS. 1, 2 when a hypothesized embedding was erroneous. In other words, there was not a link between the labels in the label time series that were selected to be embedding relevant and the time series data. Although it is difficult to recognize in the two-dimensional representation, the erroneous hypothesis collapses of the embedding into an unstructured dimension.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated and propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated and propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magnetooptical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving multidimensional input time series data that characterizes electrical activity in a plurality of neurons and that includes data from a session or sessions that span time;
selecting positive samples and negative samples from the multidimensional input time series data for respective reference samples from the multidimensional input time series data, wherein the positive samples and negative samples are each selected with a respective predetermined distribution across the time of the session or sessions of the multidimensional input time series; and
mapping the reference samples, the positive samples, and negative samples into a common embedding space, wherein the embedding space has fewer dimensions than the multidimensional input time series data.

2. The method of claim 1, wherein the predetermined distribution of the negative samples is a uniform distribution across the time of the session or sessions of the multidimensional input time series and the predetermined distribution of the positive samples are samples that are close in time to the respective reference samples.

3. The method of claim 1, further comprising receiving a label time series that includes either continuous or categorical labels and that spans the time of the session or sessions of the multidimensional input time series.

4. The method of claim 3, wherein at least one of the predetermined distributions is a uniform distribution across the continuous or categorical labels of the label time series.

5. The method of claim 1, wherein:
the predetermined distribution for selection of positive samples enforces uniform selection of the positive samples from data from different sessions in the multidimensional input time series data.

6. The method of claim 1, wherein:
the predetermined distribution for selection of positive samples enforces uniform selection of the positive samples from data from different subjects.

7. The method of claim 1, further comprising:
using contrastive machine learning to develop the common embedding space.

8. The method of claim 7, further comprising:
determining whether the common embedding space is sufficient.

9. The method of claim 8, wherein determining whether the embedding is sufficient comprises determining differences between original labels in a label time series and labels decoded from the multidimensional input time series data using the embedding.

10. The method of claim 8, wherein determining whether the embedding is sufficient comprises comparing embeddings of time series data from different subjects or different sessions in the embedding.

11. The method of claim 8, wherein determining whether the embedding is sufficient comprises determining whether an objective function that characterizes the representation of the reference, positive, and negative samples in the embedding space is sufficiently optimized.

12. The method of claim 1, wherein:
the method further comprises receiving, from a user, data identifying a variable that is to be irrelevant to the mapping of the reference samples, the positive samples, and negative samples into the common embedding space; and
selecting the positive samples comprises selecting the positive samples to have a predetermined uniform distribution with respect to the variable that is to be irrelevant.

13. The method of claim 1, wherein:
the method further comprises receiving, from a user, data identifying a variable that is to be relevant to the mapping of the reference samples, the positive samples, and negative samples into the common embedding space; and
selecting the positive samples and the negative samples comprises selecting the positive samples and the negative samples to have a predetermined non-uniform distribution with respect to the variable that is to be relevant.

14. A method of fabricating a brain-machine interface, the method comprising:
receiving multidimensional input time series data that characterizes electrical activity in a plurality of neurons and that includes data from a session or sessions that span time;
selecting positive samples and negative samples from the multidimensional input time series data for respective reference samples from the multidimensional input time series data, wherein the positive samples and negative samples are each selected with a respective predetermined distribution across the time of the session or sessions of the multidimensional input time series; and
mapping the reference samples, the positive samples, and negative samples into a common embedding space, wherein the embedding space has fewer dimensions than the multidimensional input time series data;

embodying the common embedding space in one or more data processors; and providing the brain-machine interface with inputs configured to receive either further multidimensional input time series data that share dimensions with the multidimensional input time series data from which the positive samples and negative samples were selected, or input that identifies positions within the common embedding space.

15. The method of claim 14, further comprising providing the brain-machine interface with outputs configured to output either further multidimensional input time series data that share dimensions with the multidimensional input time series data from which the positive samples and negative samples were selected, or output that identifies positions within the common embedding space.

16. A method comprising:

receiving multidimensional input time series data and related label time series data, wherein the multidimensional input time series data characterizes electrical activity in a plurality of neurons;

receiving information characterizing a hypothesis that a label of the label time series data is hypothetically relevant to a sufficient embedding of the multidimensional input time series data;

selecting positive samples and negative samples from the multidimensional input time series data, wherein the positive samples and negative samples are selected at least in part based on the hypothetically relevant label;

embedding the multidimensional input time series data in an embedding space, wherein the embedding space has fewer dimensions than the multidimensional input time series data;

determining that the embedding of the multidimensional input time series data in the embedding space is insufficient; and outputting an indication that the hypothesized relevancy of the label is incorrect.

17. The method of claim 16, wherein determining that the embedding of the multidimensional input time series data in the embedding space is insufficient comprises determining that the embedding space has collapsed.

18. The method of claim 16, wherein determining that the embedding of the multidimensional input time series data in the embedding space is insufficient comprises determining differences between labels in the label time series and labels decoded from the multidimensional input time series data using the embedding.

19. The method of claim 16, wherein determining that the embedding of the multidimensional input time series data in the embedding space is insufficient comprises comparing embeddings produced using multidimensional input time series data from different sessions or from different subjects.

20. A method of identifying distinctive characteristics of a particular input time series, the method comprising:

generating a baseline embedding of reference samples, positive samples, and negative samples into a common embedding space, the generating of the baseline embedding comprising receiving multidimensional input time series data that includes data from a session or sessions that span time, wherein the multidimensional input time series data characterizes electrical activity in a plurality of neurons, selecting positive samples and negative samples from the multidimensional input time series data for respective reference samples from the multidimensional input time series data, wherein the positive samples and negative samples are each selected with a respective predetermined distribution across the time of the session or sessions of the multidimensional input time series, and mapping the reference samples, the positive samples, and negative samples into a common embedding space, wherein the embedding space has fewer dimensions than the multidimensional input time series data;

embedding the particular input time series in the common embedding space;

comparing the embedding of the particular input time series to the baseline embedding; and identifying the distinctive characteristics of the particular input time series based on a result of the comparison.

21. The method of claim 20, further comprising diagnosing a disease or degenerative state based on the distinctive characteristics of the particular input time series.

22. The method of claim 20, wherein the particular input time series characterizes electrical activity in the brain.

* * * * *